US009523850B2

United States Patent
Shpunt

(10) Patent No.: US 9,523,850 B2
(45) Date of Patent: Dec. 20, 2016

(54) BEAM SCANNING USING AN INTERFERENCE FILTER AS A TURNING MIRROR

(71) Applicant: APPLE INC., Cupertino, CA (US)

(72) Inventor: Alexander Shpunt, Tel Aviv (IL)

(73) Assignee: APPLE INC., Cupertino, CA (US)

( * ) Notice: Subject to any disclaimer, the term of this patent is extended or adjusted under 35 U.S.C. 154(b) by 73 days.

(21) Appl. No.: 14/551,113

(22) Filed: Nov. 24, 2014

(65) Prior Publication Data

US 2015/0234179 A1    Aug. 20, 2015

Related U.S. Application Data

(60) Provisional application No. 61/940,439, filed on Feb. 16, 2014.

(51) Int. Cl.
    *G02B 26/10* (2006.01)
    *G02B 5/28* (2006.01)
    (Continued)

(52) U.S. Cl.
    CPC ............ *G02B 26/105* (2013.01); *G02B 26/08* (2013.01); *G02B 5/28* (2013.01); *H04N 1/04* (2013.01); *Y10T 29/49* (2015.01)

(58) Field of Classification Search
    CPC . G02B 26/08; G02B 26/0816; G02B 26/0833; G02B 26/10; G02B 26/105; G02B 5/28; G02B 5/281; G02B 5/282; G02B 5/283; G01J 2003/1226; G01J 2003/1234

(Continued)

(56) References Cited

U.S. PATENT DOCUMENTS 5,708,504 A * 1/1998 Hopkins ............... G01J 3/26
    356/456
6,188,500 B1 * 2/2001 Rudeen ............... G02B 26/10
    359/204.1

(Continued)

FOREIGN PATENT DOCUMENTS

DE     102011113147 B3    1/2013
EP     1411024 A2    4/2004
KR     100867147 B1 * 11/2008

OTHER PUBLICATIONS

The English translation of Korean document (KR 100867147 B1).*

(Continued)

*Primary Examiner* — Bumsuk Won
*Assistant Examiner* — Ephrem Mebrahtu
(74) *Attorney, Agent, or Firm* — D. Kligler IP Services Ltd.

(57) ABSTRACT

Scanning apparatus includes a scanner, which is configured to scan over a field of view falling within a predefined angular range. An interference filter is positioned between the scanner and the field of view and is configured to pass light within a predefined wavelength range that is incident on the interference filter at angles within the predefined angular range, while reflecting the light within the predefined wavelength range that is incident on the interference filter at an angle that is outside the predefined angular range. An ancillary optical element communicates optically with the scanner at a wavelength within the predefined wavelength range via a beam path that reflects from the interference filter at the angle that is outside the predefined angular range.

14 Claims, 3 Drawing Sheets

(51) Int. Cl.
  *G02B 26/08* (2006.01)
  *H04N 1/04* (2006.01)
(58) Field of Classification Search
  USPC ......... 259/199.1, 201.1, 201.2, 202.1, 211.5;
    250/221, 216, 234–236; 358/482, 483,
    358/489–498; 347/233, 234, 235,
    347/241–243, 250; 353/30, 31, 34,
    353/46–51, 121; 356/3–12
  See application file for complete search history.

(56) References Cited

U.S. PATENT DOCUMENTS

| 7,903,338 | B1* | 3/2011 | Wach | G02B 5/289 |
| | | | | 359/588 |
| 2007/0258146 | A1* | 11/2007 | Gorrell | G02B 5/28 |
| | | | | 359/577 |
| 2012/0314295 | A1* | 12/2012 | Fukuyo | G02B 26/007 |
| | | | | 359/589 |
| 2013/0206967 | A1 | 8/2013 | Shpunt et al. | |
| 2013/0207970 | A1 | 8/2013 | Shpunt et al. | |
| 2014/0153001 | A1 | 6/2014 | Chayat et al. | |
| 2014/0291496 | A1 | 10/2014 | Shpunt et al. | |

OTHER PUBLICATIONS

Anderson et al., "Angle-Tuned Thin-Film Interference Filters for Spectral Imaging," Optics & Photonics News, pp. 12-13, Jan. 2011.

MacLeod, H. A., "Thin-Film Optical Filters", Fourth Edition, chapter 8.4.1 (pp. 364-367), year 2010.

International Application # PCT/US15/56297 Search Report dated Jan. 19, 2016.

Sandner et al., "3D imaging using resonant large-aperture MEMS mirror arrays and laser distance measurement", IEEE/LEOS International Conference on Optical MEMs and Nanophotonics, pp. 78-79, Aug. 11, 2008.

* cited by examiner

BEAM SCANNING USING AN INTERFERENCE FILTER AS A TURNING MIRROR

CROSS-REFERENCE TO RELATED APPLICATION

This application claims the benefit of U.S. Provisional Patent Application 61/940,439, filed Feb. 16, 2014, which is incorporated herein by reference.

FIELD OF THE INVENTION

The present invention relates generally to methods and devices for projection and capture of optical radiation, and particularly to compact optical scanners.

BACKGROUND

U.S. Patent Application Publication 2013/0207970, whose disclosure is incorporated herein by reference, describes a scanning depth engine, which includes a transmitter, which emits a beam comprising pulses of light, and a scanner, which is configured to scan the beam, within a predefined scan range, over a scene. A receiver receives the light reflected from the scene and generates an output indicative of the time of flight of the pulses to and from points in the scene. A processor is coupled to control the scanner and to process the output of the receiver so as to generate a 3D map of the scene.

In one of the embodiments disclosed in the above-mentioned publication, the light from the transmitter reflects off a beamsplitter and is then directed by a turning mirror (also referred to as a folding mirror) toward a scanning micromirror. Light pulses returned from the scene strike the micromirror, which reflects the light via the turning mirror through the beamsplitter to the receiver. The beamsplitter may have a bandpass coating, to prevent light outside the emission band of the transmitter from reaching the receiver.

SUMMARY

Embodiments of the present invention provide improved methods and apparatus for optical scanning.

There is therefore provided, in accordance with an embodiment of the present invention, scanning apparatus, which includes a scanner, which is configured to scan over a field of view falling within a predefined angular range. An interference filter is positioned between the scanner and the field of view and is configured to pass light within a predefined wavelength range that is incident on the interference filter at angles within the predefined angular range, while reflecting the light within the predefined wavelength range that is incident on the interference filter at an angle that is outside the predefined angular range. An ancillary optical element communicates optically with the scanner at a wavelength within the predefined wavelength range via a beam path that reflects from the interference filter at the angle that is outside the predefined angular range.

In a disclosed embodiment, the scanner includes a rotating mirror, which directs the beam path over the predefined angular range as the mirror rotates.

In some embodiments, the ancillary optical element includes a transmitter, which outputs a beam of light along the beam path toward the interference filter, wherein the predefined wavelength range contains an emission range of the transmitter. Additionally or alternatively, the ancillary optical element includes a receiver, which receives a beam of light along the beam path from the interference filter.

In some embodiments, the interference filter includes a bandpass filter, having a passband that contains the predefined wavelength range for rays that are incident on the interference filter at angles within the predefined angular range.

In other embodiments, the interference filter includes a notch filter, having a stopband that contains the predefined wavelength range for rays that are incident on the interference filter at the angle that is outside the predefined angular range, while allowing the light within the predefined wavelength range to pass through the interference filter at angles within the predefined angular range.

In still other embodiments, the interference filter includes a high-pass filter, having a band edge at a first wavelength longer than a maximum wavelength value of the predefined wavelength range for rays that are incident on the interference filter at angles within the predefined angular range, wherein for incidence at the angle that is outside the predefined angular range, the band edge shifts to a second wavelength that is shorter than a minimum wavelength value of the predefined wavelength range.

There is also provided, in accordance with an embodiment of the present invention, a method for scanning, which includes operating a scanner to scan over a field of view falling within a predefined angular range. An interference filter is positioned between the scanner and the field of view. The interference filter is configured to pass light within a predefined wavelength range that is incident on the interference filter at angles within the predefined angular range, while reflecting the light within the predefined wavelength range that is incident on the interference filter at an angle that is outside the predefined angular range. An ancillary optical element is directed to communicate optically with the scanner at a wavelength within the predefined wavelength range via a beam path that reflects from the interference filter at the angle that is outside the predefined angular range.

There is additionally provided, in accordance with an embodiment of the present invention, a method for producing an interference filter. The method includes defining an angular range over which a scanner is to scan over a field of view through the interference filter. A wavelength range of an ancillary optical element is defined for operation in conjunction with the scanner and an angle outside the defined angular range at which a beam path between the ancillary optical element and the scanner is to be incident on the interference filter. The interference filter is designed so as to pass light within the defined wavelength range that is incident on the interference filter at angles within the defined angular range, while reflecting the light within the defined wavelength range that is incident on the interference filter at the angle at which the beam path is to be incident on the interference filter.

In a disclosed embodiment, the ancillary optical element includes a beam transmitter, and defining the wavelength range includes specifying an emission range of the beam transmitter.

In some embodiments, designing the interference filter includes choosing an effective refractive index of the interference filter so as to provide a desired shift in transmission and reflection of the filter within the defined wavelength range as a function of the angle of incidence of the beam path on the filter.

The present invention will be more fully understood from the following detailed description of the embodiments thereof, taken together with the drawings in which:

DETAILED DESCRIPTION OF EMBODIMENTS

Figure 1:
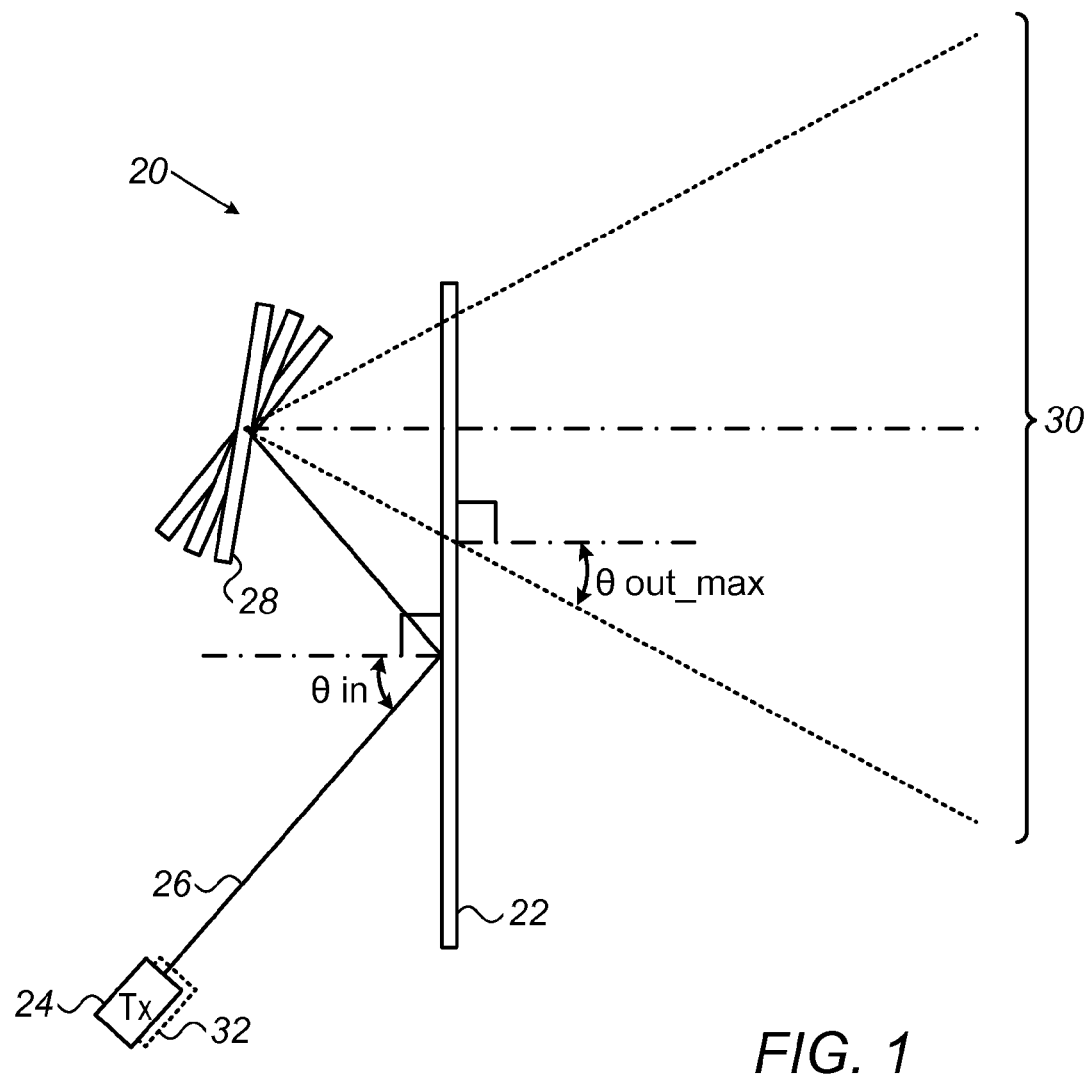
FIG. 1 is a schematic top view of an optical scanner, in accordance with an embodiment of the present invention.

The turning mirror in the scanning depth engine of the above-mentioned U.S. Patent Application Publication 2013/0207970 is useful in reducing the overall size of the engine. Embodiments of the present invention achieve a still more compact design and reduced component count by integrating this sort of beam-turning function into a bandpass filter element, and thus eliminating entirely the need for a separate turning mirror. This novel design is useful not only in scanning depth engines, but also in compact scanning optical projectors and receivers that may be used in other applications.

The disclosed embodiments make use of thin-film interference filters, which can be engineered to provide blocking and transmission in given wavelength ranges using techniques of design and manufacture that are known in the art. The wavelength response of such an interference filter changes as a function of the angle of incidence of light rays on the filter, wherein typically the spectral transmission band of the filter shifts toward shorter wavelengths as the angle of incidence increases. (The term "light" is used herein to refer broadly to optical radiation, which may be in the visible, ultraviolet, or infrared wavelength range.) This phenomenon of angular filter shift is described, for example, by Anderson et al., in "Angle-Tuned Thin-Film Interference Filters for Spectral Imaging," *Optics & Photonics News* (Jan., 2011), pages 12-13, which is incorporated herein by reference. MacLeod provides further information on this subject in *Thin-Film Optical Filters* (Fourth Edition, 2010), and particularly in section 8.4.1, which is incorporated herein by reference.

The magnitude of the angular shift of the spectral transmission of a given filter is controlled by the effective index of refraction of the filter, $n_{eff}$. Typical values of $n_{eff}$ are between 1.47 and 2. The lower the value of $n_{eff}$, the greater will be the spectral shift relative to the angle of incidence. The dependence of the spectral shift of transmission wavelength $\lambda$ as a function of angle of incidence $\theta$ is expressed by the following formula, given by Anderson et al.:

$$\lambda(\theta) = \lambda(0) \sqrt{1 - \frac{\sin^2(\theta)}{n_{eff}^2}}$$

Embodiments of the present invention make use of this feature by applying the same interference coating on a single substrate to pass light of a given design wavelength when incident at low angles (i.e., angles near the normal to the substrate), while reflecting the light when incident at higher angles (farther from the normal). Thus, the coated substrate can serve both as the turning mirror for a beam of light that is directed toward it at a high angle, and as an effectively transparent plate for the same beam of light when scanned through the filter in a lower range of angles. As an added benefit, the bandpass filter reduces the reception of undesired stray light outside the wavelength range of interest. As noted earlier, this dual use of the coated substrate facilitates more compact scanner designs with a reduced component count relative to scanners that are known in the art.

FIG. 1 is a schematic top view of a scanning engine 20 that makes use of the angular selectivity of an interference filter 22, in accordance with an embodiment of the present invention. Filter 22 comprises a suitable substrate, such as a glass plate, with a coating of multiple thin-film layers that are chosen to give the desired behavior. A beam transmitter 24, such as a laser, outputs a beam of light along a beam path 26, which is incident on filter 22 at an angle of incidence $\theta_{in}$ (measured relative to the normal of the filter). The beam is reflected from the filter toward a scanner, such as a rotating mirror 28, which directs the beam outward through interference filter 22 to scan over a field of view 30 within a predefined angular range. Mirror 28 scans the field of view over an angular range such that the maximal outgoing angle of incidence through the filter is $\theta_{out\_max}$.

As explained above, interference filter 22, which is positioned between scanning mirror 28 and field of view 30, is configured to pass light within a predefined wavelength range when the light is incident on the interference filter at angles within the predefined angular range of the scanning mirror. At these angles, filter 22 reflects or otherwise blocks light outside the predefined wavelength range. Typically, as explained further hereinbelow, the predefined wavelength range corresponds to the operating wavelength range of scanning engine 20, which may correspond, for example, to the emission band of transmitter 24.

At the same time, filter 22 reflects the light within the predefined wavelength range that is incident on the interference filter at a certain angle $\theta_{in}$ (or practically speaking, in a range of angles around $\theta_{in}$, which can be of substantial width) outside the predefined angular range. An ancillary optical element, such as transmitter 24, communicates optically with the scanner via beam path 26, which reflects from the interference filter at the angle $\theta_{in}$, which is greater than $\theta_{out\_max}$ and is thus outside the predefined angular range of filter 22.

Scanning engine 20 may comprise other sorts of ancillary optical elements, such as a receiver 32, in addition or alternatively to transmitter 24. For example, in some applications, such as time-of-flight scanners used in depth mapping, light will be reflected back from field of view 30 toward filter 22 and scanning mirror 28 over roughly the range of angles that is defined by the rotation of the mirror, between 0° and $\theta_{out\_max}$. Filter 22 will transmit this incoming beam toward scanning mirror 28, and will then reflect the beam at a higher angle toward receiver 32 along beam path 26 as shown in FIG. 1, but in the reverse direction to the beam from transmitter 24.

The design parameters of the coating of interference filter 22 are selected so that the wavelength of transmitter 24 falls within the filter passband for rays that are incident on filter 22 at angles from zero up to $\theta_{out\_max}$. At the same time, at higher angles, in the vicinity of $\theta_{in}$, filter 22 reflects light at the transmitter wavelength. Typically, the emission wavelengths of common transmitters, such as semiconductor lasers, can vary within certain ranges, due to such factors as production tolerance and temperature, as well as due to modulation-related band widening. Therefore, filter 22 may be designed to exhibit the desired angle-dependent behavior over a range of wavelengths that contains the emission range of transmitter 24, which extends between minimum and maximum wavelength values $\lambda_L$ and $\lambda_H$.

As illustrated by this embodiment, a major benefit of using a carefully-designed interference filter 22 in place of a separate turning mirror is that a given wavelength band (in this case, the emission band of transmitter 24, tolerances and variations included) is reflected in a certain angular range and transmitted in another angular range. The reflection and transmission both take place through the same physical aperture of the filter, which thus breaks the inherent geometrical constraints of a conventional folding mirror. When a conventional folding mirror is used, the "internal" beam, reflected by the folding mirror prior to reflection from the scanning mirror, must be separate in space from the "external" beam reflected from the scanning mirror, for all orientations of the scanning mirror. Such separation imposes limitations on the positioning of the folding mirror, which result in a large physical size of the scanning engine. By contrast, when interference filter is applied as described herein, no such physical separation is required, resulting in a much more compact design.

FIGS. 2A-C, 3A-C, and 4A-C are schematic representations of idealized filter spectral responses for use in embodiments of the present invention. The plots show transmission of filter 22 as function of wavelength at three different angles of incidence: normal incidence ($\theta=0°$), $\theta_{out\_max}$, and $\theta_{in}$, relative to an emission range 40 of transmitter 24. The value T=1 corresponds to full transmission, while T=0 is full reflection. (Of course, actual filters will exhibit rounded curves, and will not fully reach T=1 or T=0, but designs approximating the responses shown in the figures can be achieved using techniques that are known in the art.)

Figure 2A:
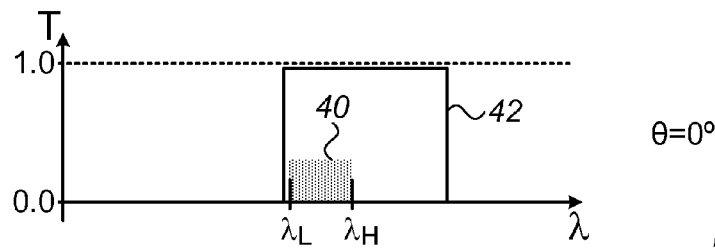
FIGS. 2A-C, 3A-C, and 4A-C are schematic representations of idealized filter spectral responses for use in embodiments of the present invention.
Figure 2B:
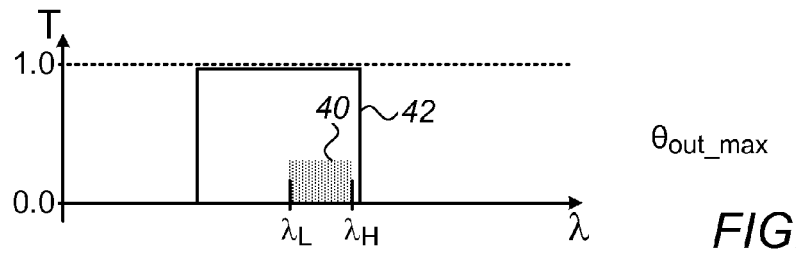
Figure 2C:
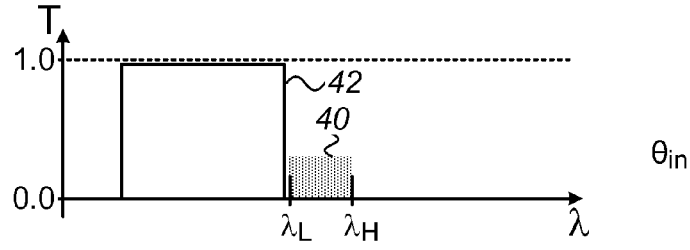

FIGS. 2A-2C show the response of filter 22 with a narrow passband 42, while the filter is reflective outside this range. As explained above and shown in these figures, passband 42 shifts to shorter wavelength with increasing angle of incidence. For angles of incidence in the range between 0° and $\theta_{out\_max}$, as shown respectively in FIGS. 2A and 2B, the filter passes light of wavelengths in range 40, between $\lambda_L$ and $\lambda_H$. At the higher angle $\theta_{in}$, however, the shift of passband 42 to shorter wavelengths causes filter 22 to reflect wavelengths between $\lambda_L$ and $\lambda_H$, as shown in FIG. 2C.

Figure 3A:
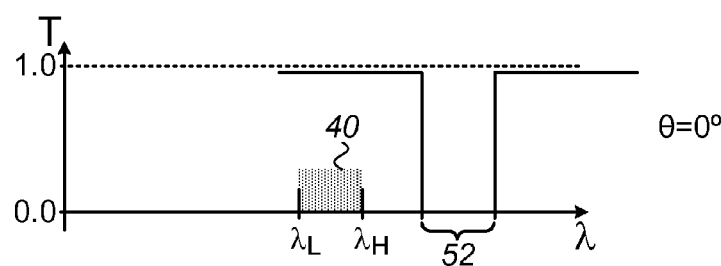
Figure 3B:
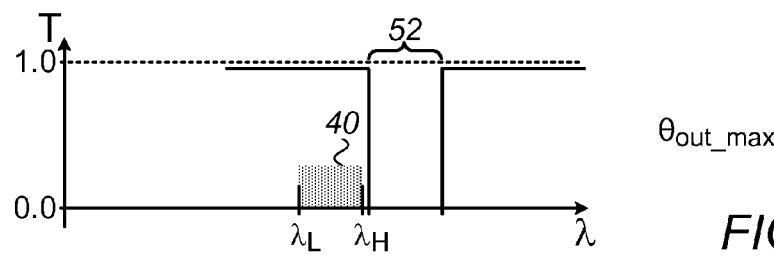
Figure 3C:
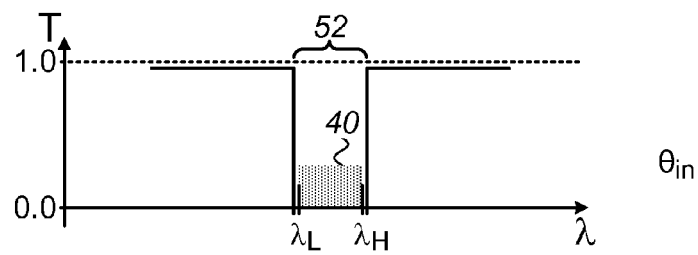

FIGS. 3A-3C show the response of filter 22 when configured as a notch filter, with a narrow stopband 52 and passbands extending above and below the stopband. As in the preceding embodiment, stopband 52 shifts to shorter wavelength with increasing angle of incidence. The location and width of stopband 52 are chosen so that filter 22 passes wavelengths in range 40, between $\lambda_L$ and $\lambda_H$, for angles in the range between 0° and $\theta_{out\_max}$, as shown in FIGS. 3A and 3B. The wavelength shift of stopband 52 at higher angles, however, causes filter 22 to reflect wavelengths in range 40 for incidence at or near $\theta_{in}$, as shown in FIG. 3C.

Figure 4A:
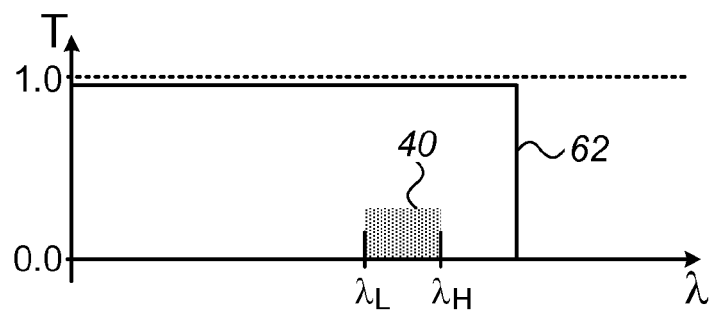
Figure 4B:
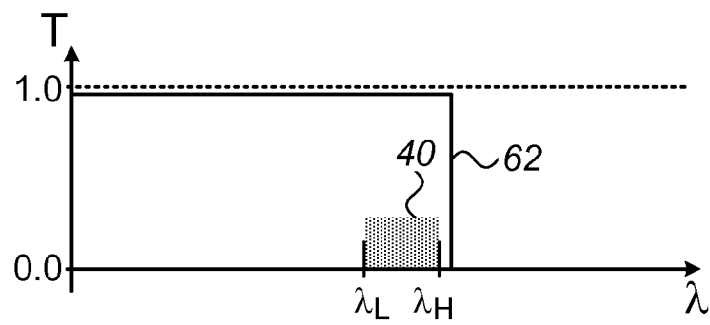
Figure 4C:
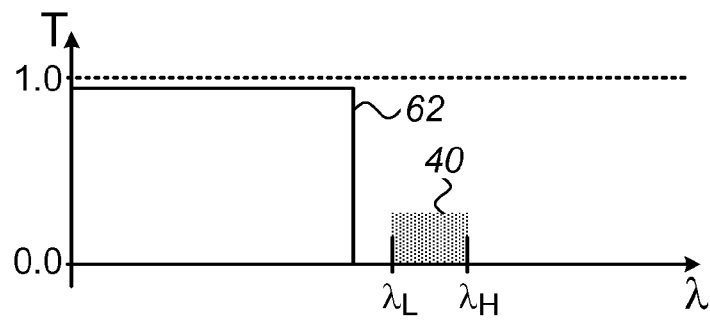

FIGS. 4A-4C show the response of filter 22 configured as a high-pass filter, which passes radiation at wavelengths shorter than a certain band edge 62 and reflects radiation of longer wavelengths. Again, band edge 62 shifts to shorter wavelengths with increasing angle of incidence. The band edge in this case is chosen so that filter 22 passes wavelengths between $\lambda_L$ and $\lambda_H$ for angles in the range between 0° and $\theta_{out\_max}$, as shown in FIGS. 4A and 4B, but reflects these wavelengths for incidence at or near $\theta_{in}$, as shown in FIG. 4C.

Referring to the above formula for wavelength shift as a function of angle, in order to achieve the filter behavior that is shown in FIGS. 2A-C and 3A-C, the filter design parameters should be chosen so as to satisfy the relation:

$$\lambda_H - \lambda_L < \lambda_C \left[ \sqrt{1 - \left(\frac{\sin\theta_{in}}{n_{\mathit{eff}}}\right)^2} - \sqrt{1 - \left(\frac{\sin\theta_{out\_max}}{n_{\mathit{eff}}}\right)^2} \right]$$

wherein $\lambda_C$ is the center wavelength of the filter. (A similar formula may be derived to define the band edge behavior of the high-pass filter illustrated in FIGS. 4A-4C.)

The above relation is approximate, and the actual filter behavior will depend on details of the filter design. For example, practical filter curves will generally deform with angle of incidence, and not just shift, and polarization splitting may occur, along with other deviations from ideal behavior. In practice, the filter layer structure may be optimized to yield optimal compliance with all requirements, using computer-based optimization techniques in common use by various vendors.

Although the formula above can serve as a guideline for filter design, in practice techniques of filter design, simulation and fabrication that are known in the art will be used to achieve the required transmission characteristics for angles in the range 0 to $\theta_{out\_max}$, and reflection for angles around $\theta_{in}$ for all laser wavelengths. The value of $n_{\mathit{eff}}$ can be chosen, by appropriate choice of filter layer materials and thicknesses, in order to tune the angular behavior of the filter so that the filter is reflective for the entire laser wavelength range at $\theta_{in}$ and (nearly) fully transmissive for incidence angles 0° and $\theta_{out\_max}$.

Although the figures show a certain specific scanner geometry and filter characteristics, the principles of the present invention may also be applied, mutatis mutandis, in other scanner types and using other sorts of filters. For example, it is not necessary in all embodiments of the present invention that the transmission range of the interference filter be 0 to $\theta_{out\_max}$ and reflection range include $\theta_{in}$ (with margins of angle tolerances). Rather, it is sufficient that there be two distinct angular ranges: the transmission range and the reflection range. Thus, in alternative embodiments (not shown in the figures), the geometry of the scanning engine may be modified so that an interference filter serves as a mirror for received radiation and as transparent cover glass for the transmitted radiation. Other embodiments that use an interference filter with disjoint transmit and receive ranges will be apparent to those skilled in the art and are considered to be within the scope of the present invention.

As another example, whereas liquid-crystal-on-silicon (LCOS) scanners and other types of reflective arrays that are known in the art use polarized light, with beamsplitters and quarter-wave plates, to illuminate the array, these elements may be replaced by an interference filter designed in accordance with the principles explained above. In this manner, the polarization requirements and geometrical constraints associate with the array may be relaxed.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Scanning apparatus, comprising:
a scanner, which is configured to scan over a field of view falling within a predefined angular range;
an interference filter, which is positioned between the scanner and the field of view and is configured to pass light within a predefined wavelength range that is incident on the interference filter at angles within the predefined angular range, while reflecting the light within the predefined wavelength range that is incident on the interference filter at an angle that is outside the predefined angular range;
a transmitter, which outputs a beam of light at an emission wavelength of the transmitter, which is within the predefined wavelength range, via a beam path that is angled from the transmitter to the interference filter so as to be incident on and reflect from the interference filter at the angle that is outside the predefined angular range,
wherein the interference filter is oriented so as to reflect the incident beam toward the scanner, which receives and scans the reflected beam over the field of view so that the scanned beam is transmitted through the interference filter; and
a receiver, which receives a further beam of light along the beam path that is transmitted through and then reflected from the interference filter.

2. The apparatus according to claim 1, wherein the scanner comprises a rotating mirror, which directs the beam path over the predefined angular range as the mirror rotates.

3. The apparatus according to claim 1, wherein the interference filter comprises a bandpass filter, having a passband that contains the predefined wavelength range for rays that are incident on the interference filter at angles within the predefined angular range.

4. The apparatus according to claim 1, wherein the interference filter comprises a notch filter, having a stopband that contains the predefined wavelength range for rays that are incident on the interference filter at the angle that is outside the predefined angular range, while allowing the light within the predefined wavelength range to pass through the interference filter at angles within the predefined angular range.

5. The apparatus according to claim 1, wherein the interference filter comprises a high-pass filter, having a band edge at a first wavelength longer than a maximum wavelength value of the predefined wavelength range for rays that are incident on the interference filter at angles within the predefined angular range, wherein for incidence at the angle that is outside the predefined angular range, the band edge shifts to a second wavelength that is shorter than a minimum wavelength value of the predefined wavelength range.

6. A method for scanning, comprising:
operating a scanner to scan over a field of view falling within a predefined angular range;
positioning between the scanner and the field of view an interference filter that is configured to pass light within a predefined wavelength range that is incident on the interference filter at angles within the predefined angular range, while reflecting the light within the predefined wavelength range that is incident on the interference filter at an angle that is outside the predefined angular range;
operating a transmitter to output a beam of light at an emission wavelength of the transmitter, which is within the predefined wavelength range, via a beam path that is angled from the transmitter to the interference filter so as to be incident on and reflect from the interference filter at the angle that is outside the predefined angular range,
wherein positioning the interference filter comprises orienting the interference filter so as to reflect the incident beam toward the scanner, which receives and scans the reflected beam over the field of view so that the scanned beam is transmitted through the interference filter; and
operating a receiver to receive a further beam of light along the beam path that is transmitted through and then reflected from the interference filter.

7. The method according to claim 6, wherein operating the scanner comprises rotating a mirror so as to direct the beam path over the predefined angular range as the mirror rotates.

8. The method according to claim 6, wherein the interference filter comprises a bandpass filter, having a passband that contains the predefined wavelength range for rays that are incident on the interference filter at angles within the predefined angular range.

9. The method according to claim 6, wherein the interference filter comprises a notch filter, having a stopband that contains the predefined wavelength range for rays that are incident on the interference filter at the angle that is outside the predefined angular range, while allowing the light within the predefined wavelength range to pass through the interference filter at angles within the predefined angular range.

10. The method according to claim 6, wherein the interference filter comprises a high-pass filter, having a band edge at a first wavelength longer than a maximum wavelength value of the predefined wavelength range for rays that are incident on the interference filter at angles within the predefined angular range, wherein for incidence at the angle that is outside the predefined angular range, the band edge shifts to a second wavelength that is shorter than a minimum wavelength value of the predefined wavelength range.

11. A method for producing of an interference filter, the method comprising:
defining an angular range over which a scanner is to scan over a field of view between zero and $\theta_{out\_max}$ through the interference filter;
defining a wavelength range comprising wavelengths between $\lambda_L$ and $\lambda_H$ of an ancillary optical element for operation in conjunction with the scanner and an angle $\theta_{in}$ outside the defined angular range at which a beam path between the ancillary optical element and the scanner is to be incident on the interference filter; and
designing the interference filter with a center wavelength $\lambda_C$ and an effective refractive index $n_{\mathit{eff}}$ chosen such that:

$$\lambda_H - \lambda_L < \lambda_C \left[ \sqrt{1 - \left(\frac{\sin\theta_{in}}{n_{\mathit{eff}}}\right)^2} - \sqrt{1 - \left(\frac{\sin\theta_{out\_max}}{n_{\mathit{eff}}}\right)^2} \right],$$

so as to pass light within the defined wavelength range that is incident on the interference filter at angles within the defined angular range, while reflecting the light within the defined wavelength range that is incident on the interference filter at the angle at which the beam path is to be incident on the interference filter.

12. The method according to claim 11, wherein the ancillary optical element comprises a beam transmitter, and wherein defining the wavelength range comprises specifying an emission range of the beam transmitter.

13. The method according to claim 11, wherein designing the interference filter comprises choosing the effective refractive index of the interference filter so as to provide a desired shift in transmission and reflection of the filter within the defined wavelength range as a function of the angle of incidence of the beam path on the filter.

14. The method according to claim 11, wherein the interference filter is of a type selected from a group of filter types consisting of a bandpass filter, a notch filter, and a high-pass filter.

* * * * *